United States Patent [19]

Shimizu et al.

[11] Patent Number: 4,946,265

[45] Date of Patent: Aug. 7, 1990

[54] MICROSCOPE WHOSE ENLARGEMENT MAGNIFICATION IS CHANGEABLE

[75] Inventors: Yoshiyuki Shimizu, Miura; Reiko Ohyama, Kawasaki, both of Japan

[73] Assignee: Nikon Corporation, Tokyo, Japan

[21] Appl. No.: 282,111

[22] Filed: Dec. 9, 1988

[30] Foreign Application Priority Data

Dec. 10, 1987 [JP] Japan ................................. 62-313354

[51] Int. Cl.[5] ...................... G02B 21/02; G02B 15/02; G02B 4/06
[52] U.S. Cl. .................................... 350/520; 350/254; 350/414; 350/453
[58] Field of Search ................ 350/520, 254, 414, 453

[56] References Cited

U.S. PATENT DOCUMENTS

| 2,133,509 | 10/1938 | Hall et al. | 350/520 |
| 4,365,871 | 12/1982 | Muchel | 350/414 |
| 4,715,697 | 12/1987 | John et al. | 350/520 |
| 4,717,246 | 1/1988 | Fehr et al. | 350/520 |

FOREIGN PATENT DOCUMENTS 868077 2/1953 Fed. Rep. of Germany ...... 350/520
3205305 12/1982 Fed. Rep. of Germany ...... 350/414

Primary Examiner—Jon W. Henry
Attorney, Agent, or Firm—Shapiro and Shapiro

[57] ABSTRACT

A microscope whose enlargement magnification is changeable includes a plurality of interchangeable first objective lenses of different focal lengths for changing a divergent light flux from an object on a stage into a parallel light flux, a first interchanging device for moving the first objective lenses and interchangeably installing them on a predetermined optic axis, a plurality of interchangeable second objective lenses of different focal lengths for condensing the parallel light flux from the first objective lenses and forming an enlarged image of the object at a predetermined position, an eyepiece for observing therethrough the enlarged image of the object formed by the second objective lenses, a prism for directing the light flux from the second objective lenses to the eyepiece, and a second interchanging device provided between the first interchanging device and the prism for moving the second objective lenses and interchangeably installing them on the predetermined optic axis.

9 Claims, 4 Drawing Sheets

MICROSCOPE WHOSE ENLARGEMENT MAGNIFICATION IS CHANGEABLE

BACKGROUND OF THE INVENTION

1. Field of the Invention

This invention relates to a microscope whose overall magnification is changeable, and in particular to a microscope in which the image magnification obtained by an objective lens can be changed in multiple stages to change the range or size of an object to be examined seen in the field of view of the microscope.

2. Related Background Art

As a microscope of this type, there is known one shown in FIG. 8 of the accompanying drawings wherein an infinity area is formed between first and second objective lenses and further the overall magnification is adjustable by the use of a zoom lens.

That is, in FIG. 8, a light flux obtained from a sample 2 placed on a stage 1 is converted into a parallel light flux through a first objective lens $L_{01}$, whereafter it is condensed by a second objective lens $L_{02}$ and forms an intermediate image forwardly of a zoom lens $L_z$ through the intermediary of a first rectangular prism 3 and a mirror M1.

The zoom lens $L_z$ is designed to re-image the intermediate image formed forwardly of the zoom lens $L_z$ on an intermediate image plane 5 through the intermediary of mirrors M2, M3 and M4 and a second rectangular prism 4.

Thus, the intermediate image plane 5 is formed above the second objective lens $L_{02}$, and an intermediate image of a magnification $M_0$ determined by the first objective lens $L_{01}$, the second objective lens $L_{02}$ and the zoom lens $L_z$ can be formed on the intermediate image plane 5, and the magnification can be varied continuously within a predetermined range.

Accordingly, when the sample 2 is to be observed through an eyepiece $L_E$ provided above the intermediate image plane 5, the sample 2 can be observed at an overall magnification M represented by the following equation:

$$M = M_0 \cdot M_E \qquad (1)$$

where M is the magnification of the eyepiece $L_E$.

Thus, by providing the zoom lens $L_z$ whose magnification can be adjusted in addition to the first objective lens $L_{01}$ and the second objective lens $L_{02}$, the magnification $M_0$ of the intermediate image can be varied continuously and the overall magnification M can be adjusted to a desired magnification other than the magnification determined by a combination of the first and second objective lenses $L_{01}$ and $L_{02}$ and the eyepiece $L_E$. In this case, the size and range of the image for the field of view of the microscope are determined by the magnification of the image by the first and second objective lenses $L_{01}$ and $L_{02}$ and the zoom lens $L_z$.

However, if the zoom lens $L_z$ is thus added in addition to the first objective lens $L_{01}$ and the second objective lens $L_{02}$, the number of optical elements is increased by the addition of the zoom lens $L_z$, and this has led to the problem that flare occurs or the transmittance is reduced to degrade the quality of the image.

Further, the fact that the prisms 3 and 4 and the mirrors M1–M4 are provided and the optical path from the first objective lens $L_{01}$ to the intermediate image plane 5 is bent and the zoom lens $L_z$ is provided leads not only to the problem that the microscope body becomes bulky, but also to the problem that the construction of the entire microscope becomes complicated.

Incidentally, if the prisms 3 and 4 and the mirrors M1–M4 are eliminated and the optical path from the first objective lens $L_{01}$ to the intermediate image plane 5 is made straight and the zoom lens $L_z$ is disposed on this optical path, the construction of the whole can be simplified correspondingly to the elimination of the prisms 3 and 4 and the mirrors M1–M4.

However, even if this is done, the zoom lens $L_z$ will become necessary, and this leads to the problem that the construction of the whole becomes correspondingly complicated and the quality of the image is degraded. Further, if the optical path is made straight and the zoom lens $L_z$ is disposed therein, the eyepiece $L_E$ will unavoidably have to be disposed at a high position distant from the sample 2, and this has led to the problem that the microscope becomes very inconvenient to use.

SUMMARY OF THE INVENTION

Accordingly, the present invention has been made with the above-noted points taken into account and an object thereof is to provide a microscope in which the deterioration of the quality of image is little and the overall magnification, particularly, the size and range of image for the field of view of the microscope, can be varied in multiple stages and moreover, which is simple in construction as a whole.

To solve the above-noted problems, the microscope according to the present invention has a plurality of interchangeable first objective lenses for changing a light flux from an object into a parallel light flux, first interchanging means for removably disposing said first objective lenses on a predetermined optic axis, a plurality of interchangeable second objective lenses for condensing the light flux from said first objective lenses disposed on said predetermined optic axis and forming an enlarged image of the object at a predetermined position, and a prism for directing the light flux from said second objective lenses to an eyepiece and a photographing apparatus. The plurality of second objective lenses have different focal lengths and are interchangeable with one another. Second interchanging means for disposing a desired one of said plurality of second objective lenses on said predetermined optic axis is disposed between said first interchanging means and said prism.

Since the microscope of the present invention is constructed as described above, the space between the first objective lenses and the second objective lenses is set to an infinity area and the second objective lenses are changed over, whereby the deterioration of the quality of image can be obviated by a simple construction as a whole and moreover, the magnification can be changed over to a number of overall magnifications.

Other objects, features and effects of the present invention will become fully apparent from the following detailed description taken in conjunction with the accompanying drawings.

DESCRIPTION OF THE PREFERRED EMBODIMENTS

Some embodiments of the present invention will hereinafter be described in detail with reference to the drawings.

(1) Principle of Overall Magnification Change-over

Figure 1:
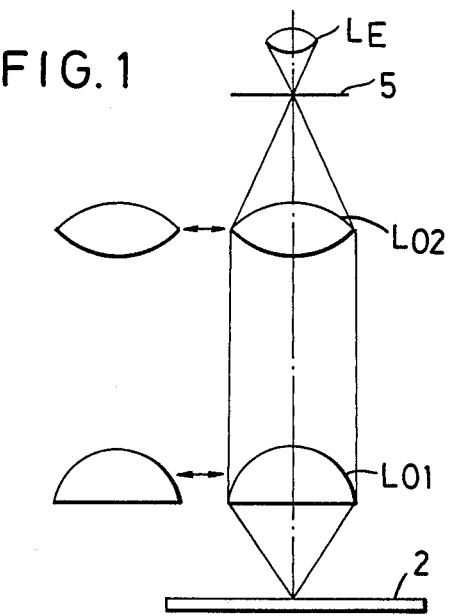
FIG. 1 illustrates the principle of the change-over of overall magnification by the present invention.
Figure 8:
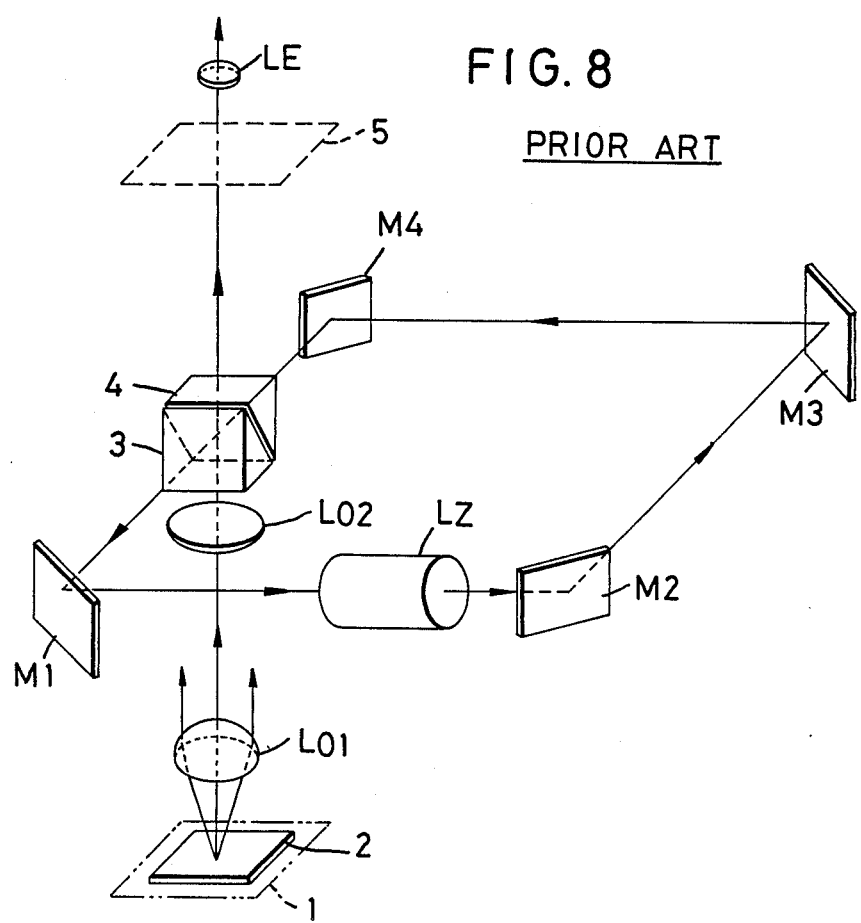
FIG. 8 shows the arrangement of an optical system according to the prior art.

FIG. 1 shows the principle of overall magnification change-over and in FIG. 1, portions corresponding to those in FIG. 8 are designated by identical reference characters. A light flux obtained from a sample 2 is converted into a parallel light flux by an interchangeable first objective lens $L_{01}$, and an infinity area in which the light flux is parallel is formed in the area from the first objective lens $L_{01}$ to an interchangeable second objective lens $L_{02}$.

If this is done, when the focal lengths of the first objective lens $L_{01}$ and the second objective lens $L_{02}$ are $f_{01}$ and $f_{02}$, respectively, and the magnification of the objective lenses is $M_0$ and the magnification of an eyepiece $L_E$ is $M_E$, the overall magnification M of the microscope can be represented by the following equation:

$$M = M_0 \cdot M_E \quad (2)$$
$$= \frac{f_{02}}{f_{01}} \cdot M_E$$

Accordingly, if a plurality of second objective lenses $L_{02}$ having different focal lengths $f_{02}$ are prepared and these are changed over as required, the overall magnification M can be further varied in a predetermined range relative to the magnification determined by the first objective lens $L_{01}$ and the eyepiece $L_E$.

If this is done, even if a zoom lens or the like complicated in lens construction is not provided, the overall magnification can be adjusted and therefore, the construction of the whole can be simplified correspondingly and occurrence of flare or the like can be obviated.

Further, not only the combination of the first and second objective lenses $L_{01}$ and $L_{02}$ can be changed over, but also by forming an infinity area in which the light flux is parallel between the first and second objective lenses $L_{01}$ and $L_{02}$, the aberrations caused by the first and second objective lenses $L_{01}$ and $L_{02}$ can be simply corrected, and there can be provided a microscope which is correspondingly simple in construction as a whole and moreover can be varied to various magnifications.

Also, in fact, in a popular microscope having a long barrel length which is constructed of an objective lens and an eyepiece, unused space is left in the arm portion of the microscope or below a prism in the barrel, and by the utilization of such unused space, an infinity area is formed rearwardly of the first lens, whereby the second objective lens $L_{02}$ can be disposed, and thus, there can be provided a variable magnification microscope whose overall magnification can be adjusted by a simple construction as a whole.

Further, the second objective lens $L_{02}$ can be disposed by the use of such unused space and therefore, there can be provided a variable magnification microscope which permits the eyepiece $L_E$ to be disposed substantially at the same level as in the conventional popular microscope and which is convenient to use.

(2) First Embodiment

Figure 2:
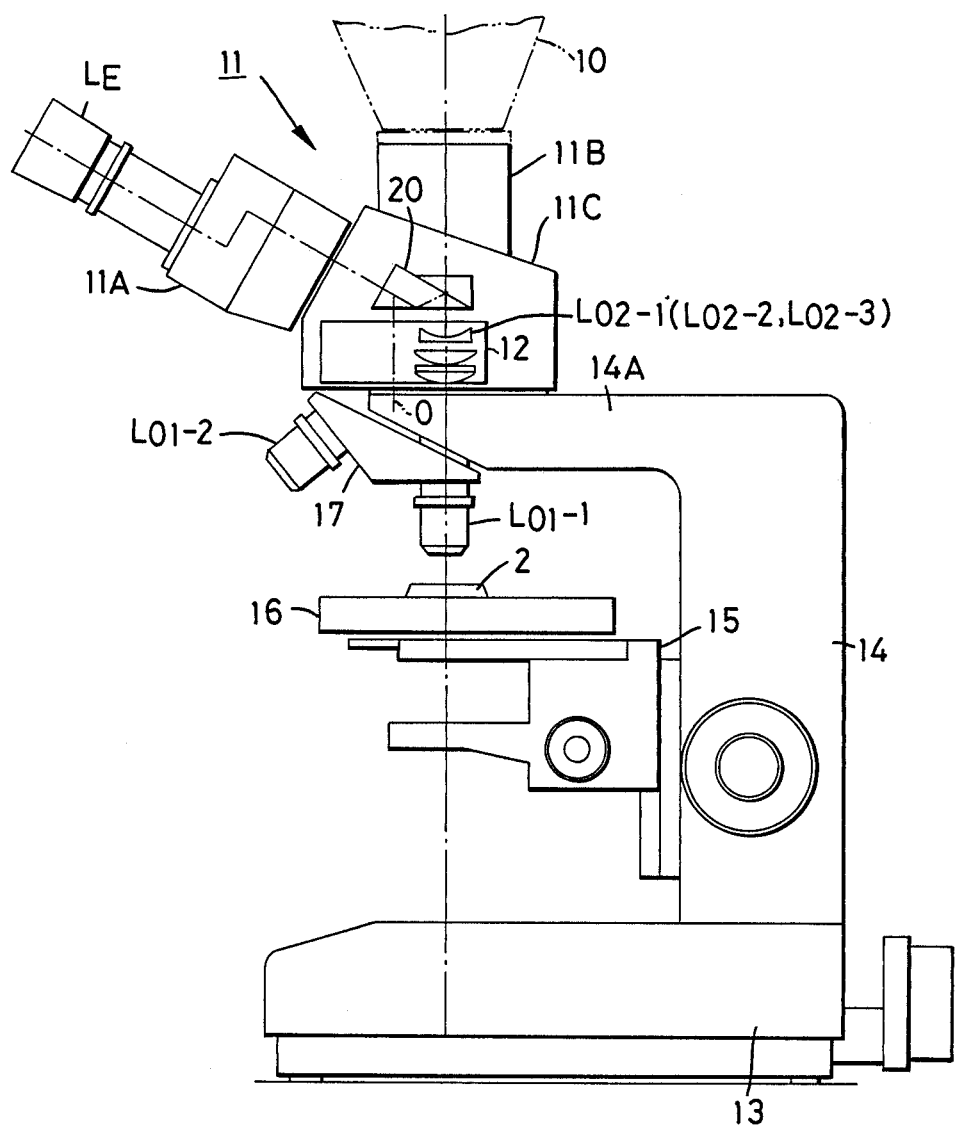
FIG. 2 schematically shows the construction of a microscope according to a first embodiment of the present invention.

FIG. 2 shows the entire construction of a binocular microscope with a photographing apparatus according to a first embodiment of the present invention. This binocular microscope is designed such that a turret 12 having three second objective lenses $L_{02-1}$, $L_{02-2}$ and $L_{02-3}$ mounted therein is disposed in the unused space in the prism chamber 11C of a barrel 11 on top of which a photographing apparatus 10 is mounted and the second objective lenses $L_{02-1}$, $L_{02-2}$ and $L_{02-3}$ are interchanged.

An L-shaped barrel strut 14 is fixed to the rear portion of the upper surface of a microscope stand 13, and the arm portion 14A of the barrel strut 14 extends so as to cross the optic axis L1 in the fore portion of the microscope stand.

A stage carrier 15 designed to be vertically moved along the optic axis L1 below the arm portion 14A is provided on the barrel strut 14, and the sample 2 is placed on a stage 16 provided on the stage carrier 15.

Also, a revolver 17 to which two first objective lenses $L_{01-1}$ and $L_{01-2}$ differing in focal length are fixed is rotatably provided on the fore end portion of the arm 14A which intersects the optic axis L1. The rotary central shaft of the revolver is mounted so as to be inclined forwardly of the optic axis L1, and by rotating the revolver 17 about the rotary central shaft, the first objective lens $L_{01-1}$ or $L_{01-2}$ may be changed over and disposed on the optic axis L1.

The revolver 17 constitutes first interchanging means for removably disposing the first objective lens $L_{01-1}$ or $L_{01-2}$ on the optic axis L1.

Figure 3:
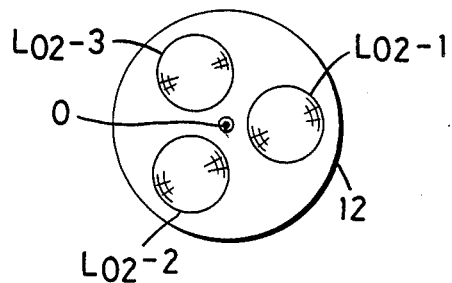
FIG. 3 is a plan view of a turret containing therein the second objective lenses shown in FIG. 2.

The barrel 11 comprises a binocular barrel portion 11A for holding the eyepiece $L_E$, a barrel portion 11B for mounting a camera thereon and a prism chamber 11C, and a prism 20 for binocularly seeing the sample 2 therethrough and causing the optical path to branch off for photographing is provided in the prism chamber 11C, and as shown in FIG. 3, the turret 12 for holding the second objective lenses is disposed below the prism 20.

As shown in FIGS. 2 and 3, in the cylindrical turret 12, the three second objective lenses $L_{02-1}$, $L_{02-2}$ and $L_{02-3}$ having focal lengths $f_{02-1}$, $f_{02-2}$ and $f_{02-3}$, respectively, are disposed circumferentially thereof in predetermined angularly spaced apart relationship, and the second objective lenses $L_{02-1}$, $L_{02-2}$ and $L_{02-3}$ are designed such that when the turret 12 is rotated, the second objective lenses $L_{02-1}$, $L_{02-2}$ and $L_{02-3}$ are stopped by a click stop device, not shown, with their respective optic axes being successively coincident with the optic axis L1 of the microscope, and the rotary central shaft O of the turret 12 is mounted while being offset toward the forward eyepiece by a predetermined distance relative to the optic axis L1.

Accordingly, in the microscope of the present embodiment, by rotating the turret 12 and interchanging the second objective lenses $L_{02-1}$, $L_{02-2}$ and $L_{02-3}$, the overall magnification can be changed and adjusted within a range represented by the following equations:

$$M_1 = \frac{f_{02-1}}{f_{01}} \cdot M_E \quad (3)$$

$$M_2 = \frac{f_{02-2}}{f_{01}} \cdot M_E \quad (4)$$

$$M_3 = \frac{f_{02-3}}{f_{01}} \cdot M_E \quad (5)$$

In the present embodiment, the turret 12 constitutes second interchanging means for interchanging and disposing desired one of the plurality of second objective lenses $L_{02-1}$, $L_{02-2}$ and $L_{02-3}$ on the optic axis L1.

Further, in the second objective lenses $L_{02-1}$, $L_{02-2}$ and $L_{02-3}$, the parallel light flux by the first objective lenses is in the infinity area and therefore, the full lengths of the lenses can be easily set equal to one another or within a predetermined range and can be easily set so that the rearward focus positions thereof coincide with one another. Accordingly, the design is such that the position of the intermediate image plane does not change when the second objective lenses are changed over.

Thus, in the microscope of the present embodiment, the level of the stage carrier 15 need not be newly finely adjusted when the second objective lenses $L_{02-1}$, $L_{02-2}$ and $L_{02-3}$ are changed over and accordingly, a desired overall magnification can be simply obtained by changing over the second objective lenses $L_{02-1}$, $L_{02-2}$ and $L_{02-3}$ as required while observing the sample 2, and the examined image of the sample 2 can be obtained within a desired range or at a desired size relative to the photographing picture plane.

In the above-described construction, the light flux obtained from the sample 2 is converted into a parallel light flux through the first objective lens $L_{01-1}$ ($L_{01-2}$) and is condensed on the intermediate image plane through a desired second objective lens $L_{02-1}$ ($L_{02-2}$, $L_{02-3}$) and thus, the sample 2 can be observed through the eyepiece $L_E$ and can be photographed as required.

The first embodiment is constructed as described above and therefore, by providing an infinity area between the first objective lenses and the second objective lenses and changing over the second objective lenses, a desired overall magnification can be easily set by a simple construction as a whole.

Further, in this case, in the prism chamber 11C of the barrel 11, the second objective lenses are contained in the unused space below the prism 20 and therefore, there can be provided a microscope in which the level of the eyepiece $L_E$ can be held at the same level as in the conventional finite area microscope and which is convenient to use and suffers less from deterioration of the quality of image.

(3) Second Embodiment

Figure 4:
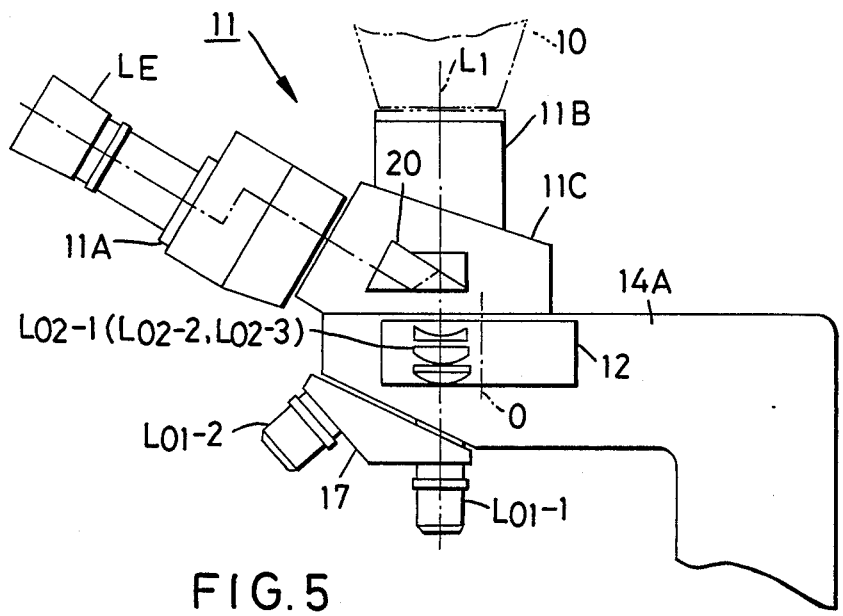
FIG. 4 schematically shows the construction of the essential portions of a microscope according to a second embodiment of the present invention.

FIG. 4 is a cross-sectional view showing a second embodiment of the present invention. In FIG. 4 wherein portions corresponding to those in FIG. 2 are designated by identical reference characters, the turret 12 containing the second objective lenses $L_{02-1}$, $L_{02-2}$ and $L_{02-3}$ is mounted in the arm 14A.

In this case, the rotary central shaft O of the turret 12 is mounted while being offset to the opposite side from the case of FIG. 2 (that is, to the rear of the optic axis L1) relative to the optic axis L1.

If, in practice, the rotary central shaft O of the turret 12 is thus offset to the opposite side of the revolver 17 holding the first objective lens $L_{01}$, the revolver 17 holding the first objective lens $L_{01}$ is mounted while being inclined and therefore, the arm portion 14A is formed correspondingly more thickly, and by the effective utilization of the generally increased unused space in the arm 14A, there can be disposed the turret 12 holding the second objective lenses $L_{02-1}$, $L_{02-2}$ and $L_{02-3}$.

According to the construction of FIG. 4, there can be obtained an effect similar to that provided by the construction of FIG. 2 and by utilizing the space in the arm portion 14A, the microscope as a whole can utilize the unused space more effectively to thereby dispose the second objective lenses $L_{02-1}$, $L_{02-2}$ and $L_{02-3}$.

(4) Third Embodiment

Figure 5:
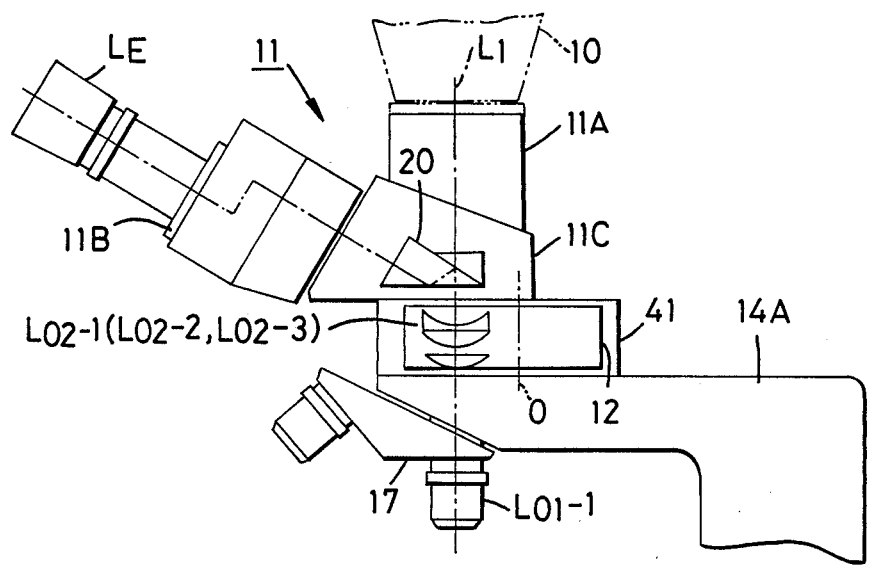
FIG. 5 schematically shows the construction of the essential portions of a microscope according to a third embodiment of the present invention.

In a third embodiment of the present invention shown in FIG. 5, an intermediate cylinder 41 containing the turret 12 therein is provided between the removably mounted prism chamber 11C and the arm 14A to thereby contain the second objective lenses $L_{02-1}$, $L_{02-2}$ and $L_{02-3}$.

According to the construction of FIG. 5, even where it is difficult to contain the second objective lenses $L_{02-1}$, $L_{02-2}$ and $L_{02-3}$ in the barrel 11 and the arm 14A, the second objective lenses $L_{02-1}$, $L_{02-2}$ and $L_{02-3}$ can be contained in the turret holding cylinder 41 and thus, there can be obtained an effect similar to that provided by the construction of FIG. 2.

Although the above embodiments have been described with respect to a case where three second objective lenses $L_{02-1}$, $L_{02-2}$ and $L_{02-3}$ are contained in the turret 12 and held in the prism chamber 11C, the arm 14A and the turret holding cylinder 41, respectively, the interchanging means for the second objective lenses $L_{02-1}$, $L_{02-2}$ and $L_{02-3}$ is not limited to the above-described turret type one, but change-over means of other type can be used.

Figure 6:
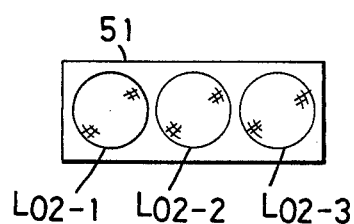
FIGS. 6 and 7 are plan views of slide type lens holders containing the second objective lenses therein.

In this case, as shown, for example, in FIG. 6, the three kinds of second objective lenses $L_{02-1}$, $L_{02-2}$ and $L_{02-3}$ may be contained in a slide type lens holder 51 and this lens holder may be slid to dispose a desired second objective lens $L_{02-1}$ ($L_{02-2}$, $L_{02-3}$) on the optic axis L1. The kinds of the second objective lenses are not limited to three, but various kinds such as two kinds or four kinds may be provided as required.

Figure 7:
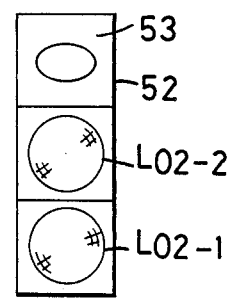

Further, where a slide type lens holder 52 is used as shown in FIG. 7, only two kinds of second objective lenses $L_{02-1}$ and $L_{02-2}$ may be disposed and one end thereof may be used as a knob 53.

Further, the above embodiments have been described with respect to a case where the overlooking prism 20 is used for binocular watching and the photographing apparatus 10 is provided, but the present invention is not restricted thereto, but is also widely applicable to microscopes designed for binocular watching or ocellar watching.

What is claimed is:

1. A microscope whose enlargement magnification is changeable including a plurality of interchangeable first objective lenses of different focal lengths for changing a divergent light flux from an object on a stage into a parallel light flux, first interchanging means for moving said first objective lenses and interchangeably installing them on a predetermined optic axis, a plurality of interchangeable second objective lenses of different focal lengths for condensing the parallel light flux from said first objective lenses and forming an enlarged image of said object at a predetermined position, an eyepiece for observing therethrough the enlarged image of said object formed by said second objective lenses, a prism for directing the light flux from said second objective lenses to said eyepiece, and second interchanging means provided between said first interchanging means and said prism for moving said second objective lenses and interchangeably installing them on said predetermined optic axis.

2. A microscope according to claim 1, further including a support arm supporting said first interchanging means and extending so as to intersect said predetermined optic axis, and a barrel having a prism chamber removably provided in the end portion of said support arm and containing said prism therein, said second objective lenses and said second interchanging means being provided in said prism chamber.

3. A microscope according to claim 1, further including a support arm supporting said first interchanging means and extending so as to intersect said predetermined-optic axis, and a barrel having a prism chamber removably provided in the end portion of said support arm and containing said prism therein, said second objective lenses and said second interchanging means being provided in said support arm.

4. A microscope according to claim 1, further including a support arm supporting said first interchanging means and extending so as to intersect said predetermined optic axis, an intermediate cylinder mounted on said support arm and containing said second interchanging means therein, and a barrel having a prism chamber removably provided in an upper portion of said intermediate cylinder and containing said prism therein.

5. A microscope according to claim 1, wherein said second interchanging means is a turret holding said plurality of second objective lenses in predetermined angularly spaced apart relationship in the circumferential direction thereof and having the center of rotation at a position eccentric from said predetermined optic axis by a predetermined distance so that the centers of the lenses successively coincide with said predetermined optic axis.

6. A microscope according to claim 1, wherein said second interchanging means is a slidable lens holder holding said plurality of second objective lenses in a row and slid while intersecting said predetermined optic axis.

7. A microscope whose enlargement magnification is changeable including a plurality of interchangeable first objective lenses of different focal lengths for changing a divergent light flux from an object on a stage into a parallel light flux, a revolver holding said first objective lenses and rotatable to interchangeably install said first objective lenses on a predetermined optic axis, a plurality of interchangeable second objective lenses of different focal lengths for condensing the parallel light flux from said first objective lenses and forming an enlarged image of said object at a predetermined position, an eyepiece for observing therethrough said enlarged image formed by said second objective lenses, a prism for directing the light flux from said second objective lenses to said eyepiece, a support arm supporting said revolver and extending so as to intersect said predetermined optic axis, a barrel having a prism chamber removably provided in the end portion of said support arm and containing said prism therein and an eyepiece cylinder portion holding said eyepiece, and a turret holding said second objective lenses in predetermined angularly spaced apart relationship in the circumferential direction thereof to interchangeably install said second objective lenses on said predetermined optic axis so that the centers of the lenses successively coincide with said predetermined optic axis, said turret being provided in said prism chamber so that the center of rotation thereof lies at a position eccentric from said predetermined optic axis toward said eyepiece by a predetermined distance.

8. A microscope whose enlargement magnification is changeable including a plurality of interchangeable first objective lenses of different focal lengths for changing a divergent light flux from an object on a stage into a parallel light flux, a revolver holding said first objective lenses and rotatable to interchangeably install said first objective lenses on a predetermined optic axis, a plurality of interchangeable second objective lenses of different focal lengths for condensing the parallel light flux from said first objective lenses and forming an enlarged image of said object at a predetermined position, an eyepiece for observing therethrough said enlarged image formed by said second objective lenses, a prism for directing the light flux from said second objective lenses to said eyepiece, a support arm supporting said revolver and extending so as to intersect said predetermined optic axis, a barrel having a prism chamber removably provided in the end portion of said arm and containing said prism therein and an eyepiece cylinder portion holding said eyepiece, and a turret holding said plurality of second objective lenses in predetermined angularly spaced apart relationship in the circumferential direction thereof to move said second objective lenses and interchange them on said predetermined optic axis so that the centers of the lenses successively coincide with said predetermined optic axis, said turret being provided in said support arm so that the center of rotation thereof lies at a position eccentric to the side opposite to said revolver by a predetermined distance relative to said predetermined optic axis.

9. A microscope whose enlargement magnification is changeable including a plurality of interchangeable first objective lenses of different focal lengths for changing a divergent light flux from an object on a stage into a parallel light flux, a revolver holding said first objective lenses and rotatable to interchangeably install said first objective lenses on a predetermined optic axis, a plurality of interchangeable second objective lenses of different focal lengths for condensing the parallel light flux from said first objective lenses and forming an enlarged image of said object at a predetermined position, a rotatable turret holding said plurality of second objective lenses in predetermined angularly spaced apart relationship in the circumferential direction thereof, an eyepiece for observing therethrough said enlarged image formed by said second objective lenses, a prism for directing the light flux from said second objective lenses to said eyepiece, a support arm supporting said revolver and extending so as to intersect said predetermined optic axis, a barrel having a prism chamber containing said prism therein and an eyepiece cylinder portion holding said eyepiece, and a turret chamber provided projectedly from said support arm and between said support arm and said prism chamber and containing said turret therein.

* * * * *